July 21, 1936.   J. H. DAVIS   2,048,247
BEARING AND METHOD OF MAKING SAME
Filed Feb. 19, 1934
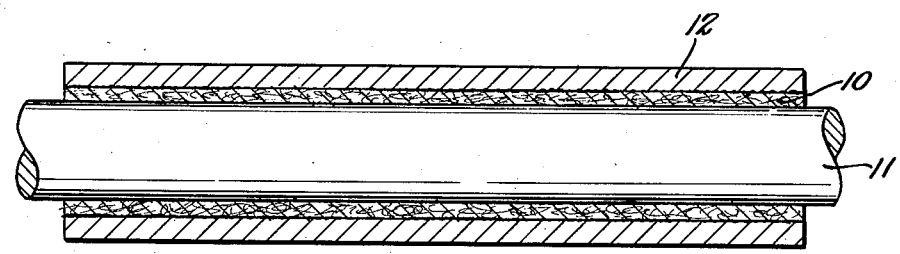
Fig. 1.
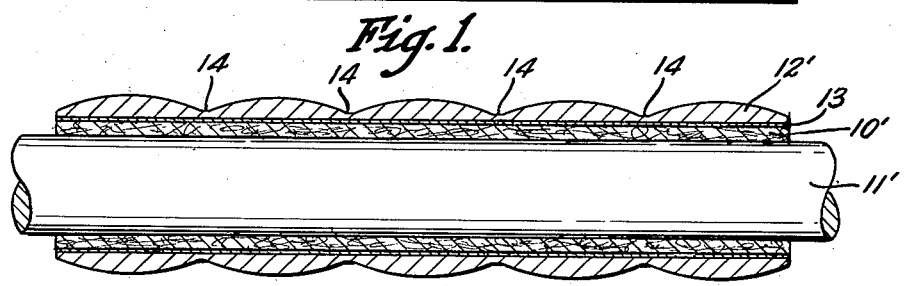
Fig. 2.
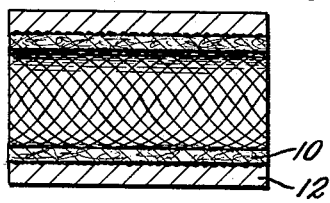
Fig. 3.
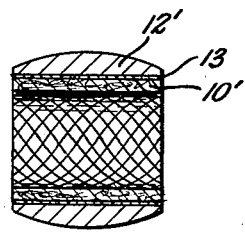
Fig. 4.
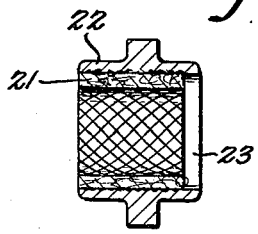
Fig. 7.
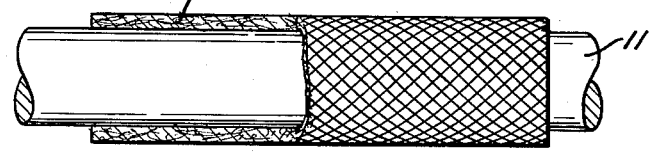
Fig. 5.
Fig. 6.
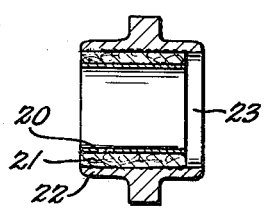
Fig. 8.
Inventor
James H. Davis
BY Spencer Hardman & Fehr
HIS ATTORNEYS Patented July 21, 1936

2,048,247

UNITED STATES PATENT OFFICE 2,048,247

BEARING AND METHOD OF MAKING SAME

James H. Davis, Dayton, Ohio, assignor to General Motors Corporation, Detroit, Mich., a corporation of Delaware Application February 19, 1934, Serial No. 711,936

12 Claims. (Cl. 22—202)

This invention relates to an improved bearing and method of making same.

An object of this invention is to provide a bearing having a rigid metal back and a fabric lining strongly bonded thereto by the metal back being cast thereupon whereby the metal back is keyed to the lining.

Another object is to provide a bearing having such a cast metal back bonded to a fabric lining which is adapted to be impregnated with a suitable lubricant. The lubricant may be a fluid such as lubricating oil or grease, or it may be a finely divided solid lubricant such as graphite, but preferably there is used with such bearings a dry lubricating material consisting chiefly of a high viscosity cellulose nitrate with a suitable plasticizer and finely divided amorphous graphite, which may be made and applied to the fabric lining as disclosed in a prior application by Harvey D. Geyer, Serial No. 680,740, filed July 17, 1933, for a Solid lubricating material, which is owned by the assignee of this application.

Another object of this invention is to provide an efficient and economical method of making such bearings by casting the metal back upon a fabric lining made of cotton or other vegetable fiber and secure a strong bond therebetween without materially burning or scorching the fabric lining. A feature of this method is the provision of a relatively thin heat-resisting coating upon the fabric lining which substantially protects the fabric from burning while the metal back is being cast thereupon but at the same time does not prevent the cast metal from bonding strongly to the fabric.

Further objects and advantages of the present invention will be apparent from the following description, reference being had to the accompanying drawing, wherein a preferred embodiment of the present invention is clearly shown.

In the drawing:

Fig. 1 illustrates a relatively long tubular woven fabric lining snugly encasing a central metal arbor and a long rigid metal backing cast in place about the fabric lining. The unit is shown as it is removed from the casting dies with the central arbor still in place. The arbor is later withdrawn and the long bearing unit cut into short lengths to form separate bearings.

Fig. 2 is similar to Fig. 1, except the fabric lining is shown as having had a thin coating of low-melting metal sprayed thereupon prior to having the rigid metal backing die-cast thereupon. The metal spray coat is shown of exaggerated thickness for clearness' sake.

Fig. 3 shows an individual bearing cut from the unit shown in Fig. 1.

Fig. 4 shows an individual bearing cut from the unit shown in Fig. 2.

Figs. 5 and 6 show steps in the manufacture. Fig. 5 illustrates a tubular-woven fabric lining inserted upon a central metal arbor. Fig. 6 shows a thin flat-woven fabric lining wrapped upon a central metal arbor so that the edges thereof abut tightly along a longitudinal seam.

Figs. 7 and 8 show a modification where the bearings are individually cast. Fig. 7 shows the bearing as removed from the casting dies, and Fig. 8 shows the same bearing with a dry flexible lubricating coating bonded to the bearing surface of the fabric lining.

Similar reference characters refer to similar parts throughout the several views.

Referring to Fig. 1, a long heavy tubular woven fabric lining 10 is inserted snugly upon a central metal arbor 11. The outer surface of the fabric lining 10 may be thinly coated with a suitable heat-resisting substance which will adhere to the fabric and substantially protect the fabric from burning when the rigid metal back 12 is die-cast thereupon but at the same time will permit the die-cast metal back 12 to key or bond to the fabric 10. Various experiments have shown the following heat-resisting substances to be practical for this purpose: (1) a mixture of graphite and lubricating oil; (2) a mixture of graphite and sodium silicate solution applied to the fabric and dried thereupon; (3) sodium silicate solution applied to the fabric and dried thereupon; (4) epsom salts solution, with or without graphite, applied to the fabric and dried thereupon; (5) molten low-melting point metal, such as tin, sprayed upon the outer surface of the fabric by means of a metal spray gun so as to form a flexible metal coating thereupon without burning the fabric. Such heat-resisting coatings may be applied to the fabric before or after the fabric is fitted upon the metal arbor since such coatings still permit the fabric to be flexed.

The function of such a coating is two-fold. It permits a cotton or other vegetable fiber fabric to be used without serious damage to the fabric by the heat from the die-cast metal. It also greatly decreases the tendency of the die-cast metal to flow entirely through the fabric lining at possible interstices therein and form relatively hard metal areas on the inner surface of the fabric lining. Such hard metal areas of course are ordinarily not desired since they prevent the bearing lining 10 from being uniformly resilient throughout the bearing area.

The metal back 12 is preferably die-cast upon the coated or uncoated fabric lining 10 by a suitable die-casting machine which cools the cast metal very rapidly so as to prevent the heat therefrom from destroying the strength of the fabric 10. The die-cast metal however will key itself to the fabric 10 and a strong bond between the cast metal and fabric will be obtained in a very simple and efficient manner. If no prior heat-resisting coating is used upon the fabric 10 the fabric should preferably be closely woven to reduce any tendency of the cast metal to penetrate through or too far into the fabric.

Fig. 2 is similar to Fig. 1, but shows a thin tin coating 13 which has been applied to the fabric 10' by means of a molten metal spray gun as disclosed above. This coating 13 is shown relatively exaggerated in thickness in order that it may be shown at all. Fig. 2 also shows the cast metal back 12' so shaped that when it is subsequently cut into short lengths at the peripheral valleys 14 therein, a series of short bearings having a curved outer surface will be provided, as shown in Fig. 4. Of course any other desired outer shape of the die-cast metal back 12' may be provided by providing suitably formed casting dies.

The bearings shown in Fig. 3 or 4 may be used without further lubricant in certain locations where there is little or no turning movement of the shaft extending therethrough, such for instance as a bearing for a valve stem which is seldom turned.

For ordinary bearing uses the fabric lining is impregnated with any suitable lubricant, such as lubricating oil, grease, graphite, or mixtures of these. For more severe uses the fabric lining is preferably impregnated with a recently developed resilient dry lubricant consisting chiefly of a matrix of high viscosity cellulose nitrate having a plasticizer incorporated therein and very finely divided amorphous graphite distributen in this matrix, said lubricant being made according to the above mentioned Geyer application Serial No. 680,740. This cellulose nitrate and graphite lubricant may be impregnated throughout the entire thickness of the fabric lining 10 or 10' of Figs. 3 and 4, and so provide a self-lubricating substantially permanent non-metallic lining for these bearings which has considerably more yieldability than ordinary metallic bearing linings. However if a still greater cushioning or yieldability of the bearing is desired, the fabric lining 10 may be impregnated with this lubricating material only partially through its thickness, as shown at 20 in Fig. 8. Thus the unimpregnated portion 21 of the thickness of the fabric lining will provide a cushioning layer between the rigid cast metal back 22 and the flexible self-lubricating bearing lining 20. In all cases the fabric lining will have such a strong continuous bond to the cast metal back that it will be held securely in place. The tubular woven relatively thick fabric lining 10' shown in Fig. 5 is preferably used when it is desired to impregnate only a part of the thickness of the fabric with this flexible cellulose nitrate and graphite lubricant and obtain a more pronounced cushioning effect. When a thin flat-woven fabric lining 10'' is used having a longitudinal butt seam 30 therein, as shown in Fig. 6, preferably the entire thickness of the fabric is impregnated with the cellulose nitrate and graphite lubricant since such lubricant will fill all possible interstices at the butt joint 30 and provided a smooth bearing area across this seam.

The bearings shown in Figs. 7 and 8 are individually cast and hence may be easily provided with portions 23 of the cast metal back 22 which overhang the fabric lining 21, simply by making the die cavities for casting the backs 22 accordingly. Also, obviously, the outer contour of these cast backs 22 may be made any shape desired by forming the die cavities accordingly.

While the embodiment of the present invention as herein disclosed, constitutes a preferred form, it is to be understood that other forms might be adopted, all coming within the scope of the claims which follow.

What is claimed is as follows:

1. An anti-friction bearing comprising: a woven vegetable fabric bearing lining, a die-cast metal back bonded to said lining by being cast thereupon, said metal back having a melting point above the charring temperature of said fabric lining and said fabric lining having a thin coating of heat-resisting substance to protect same from the charring temperature of said die-cast back, and a lubricating material impregnating said fabric lining.

2. An anti-friction resilient bearing comprising: a rigid cast metal back, and a resilient woven vegetable fiber lining strongly bonded to said metal back by the molten metal of said back keying to the outer surface of said lining, said cast metal having a casting temperature above the charring temperature of said fiber lining and said lining having a thin coating of heat-resisting substance to protect same during the casting of said metal back thereupon.

3. The steps in the method of making anti-friction bearings comprising: fitting a woven fabric lining into tubular form snugly upon a metal arbor, applying to said fabric lining a thin protective coating of a substance which resists burning of the fabric, then die-casting a metal back upon the coated outer surface of said fabric lining so that the die-cast metal forms a strong bond therewith and rapidly cooling the cast metal back to prevent burning of the fabric, and then impregnating the fabric lining with a lubricant.

4. The steps in the method of making bearings comprising: applying a fabric lining snugly upon a metal support and applying to said lining a thin protective coating of a substance which resists burning of the fabric, then casting a metal back directly upon the coated fabric so that the cast metal strongly bonds to the fabric lining, and rapidly cooling the cast metal back.

5. The steps in the method of making bearings comprising: coating a flexible fabric lining with a thin protective coating of a substance which resists burning of the fabric, then casting a rigid metal back directly upon the coated fabric so that the cast metal bonds to said fabric lining, and rapidly cooling the cast metal back to prevent burning of the fabric.

6. The steps in the method of making bearings comprising: spraying molten low melting metal upon a flexible fabric lining to form a thin flexible coating thereupon, then casting a rigid metal back directly upon the coated fabric surface so that the cast metal bonds to the fabric lining, and rapidly cooling the cast metal back to reduce burning of the fabric.

7. The steps in the method of making bearings comprising: providing a woven fabric lining with a thin protective coating of a heat-resisting substance, supporting said coated lining snugly upon a cold metal support, then quickly casting a rigid metal back directly upon the coated surface of said fabric lining so that the cast metal bonds to said lining.

8. The steps in the method of making bearings comprising: coating a flexible fabric lining with a heat-resisting coating including graphite, then casting a rigid metal back drectly upon the coated fabric so that the cast metal bonds to said fabric lining, and then rapidly cooling the cast metal back to minimize burning of the fabric lining.

9. The steps in the method of making bearings comprising: coating a flexible fabric lining with a heat-resisting coating including graphite and a liquid carrier therefor, then casting a rigid metal back directly upon the coated fabric so that the cast metal bonds to said fabric lining, and then rapidly cooling the cast metal back to minimize burning of the fabric lining.

10. The steps in the method of making bearings comprising: coating a flexible fabric lining with a heat-resisting coating comprising sodium silicate, then die-castng a rigid metal back directly upon the coated fabric so that the cast metal keys to the interstices in said fabric, and then rapidly cooling the cast metal back to prevent excessive heating of the fabric lining.

11. The steps in the method of producing a cast metal back having a flexible fabric lining strongly bonded thereto, comprising: spraying molten low melting metal upon a flexible fabric lining and forming a relatively thin coating thereupon keyed into the interstices in said fabric lining, then casting a rigid metal back of substantial thickness directly upon the thin metal coating and rapidly cooling the cast metal back to prevent excessive heating of the fabric lining.

12. The steps in the method of producing a cast metal back having a flexible fabric lining strongly bonded thereto, comprising: spraying molten low-melting metal upon a flexible fabric lining and forming a relatively thin coating thereupon keyed into the interstices in said fabric lining, then casting a rigid metal back of substantial thickness directly upon the thin metal coating, while the opposite surface of said fabric lining is held in snug contact with a relatively cool metal support whereby to prevent excessive heating of the fabric lining during the casting operation.

JAMES H. DAVIS.